United States Patent Office 3,076,817
Patented Feb. 5, 1963

3,076,817
NEW 3-AMINO-THIOPHENE-2-CARBOXYLIC ACIDS AND THE ESTERS THEREOF AND A PROCESS OF PREPARING SAID ACIDS AND ESTERS
Hans Fiesselmann, Erlangen, Germany, assignor to Farbwerke Hoechst Aktiengesellschaft vormals Meister Lucius & Brüning, Frankfurt am Main-Hoechst, Germany, a company of Germany
No Drawing. Filed Aug. 12, 1958, Ser. No. 754,528
Claims priority, application Germany Aug. 29, 1957
7 Claims. (Cl. 260—332.2)

The present invention relates to 3-amino-thiophene-2-carboxylic acids and the esters thereof and to a process of preparing said acids and esters.

I have found that there are obtained in a simple manner new 3-amino-thiophene-2-carboxylic acid esters of the general formula:

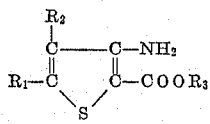

wherein $R_1$ and $R_2$ may stand for hydrogen, an alkyl or an aryl radical and $R_3$ may stand for hydrogen or a low alkyl radical, by reacting alpha,beta-dihalogeno-nitriles of the general formula

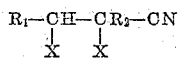

wherein $R_1$ and $R_2$ have the meanings given above and X stands for chlorine or bromine atoms, with thioglycolic acid esters in the presence of alkaline condensing agents, advantageously alkali metal alcoholates, and, if required, hydrolyzing in the usual manner the 3-amino-thiophene-2-carboxylic acid esters so obtained.

In contradistinction to the hitherto known processes, the process of the present invention enables in a very simple manner the preparation of thiophene derivatives. It could not be expected that it would be possible to carry out the somewhat peculiar reaction. It succeeds merely by the fact that, owing to the formation of the thiophene ring system, the ketimines which are primarily produced as ring closure products are immediately stabilized to form the corresponding amines.

The alpha,beta-dihalogeno-nitriles used as starting material may easily be obtained from the corresponding alpha,beta-unsaturated nitriles, such as acrylonitrile, crotonic nitrile, or cinnamic nitrile, by the addition of halogen. They may also be prepared from alpha,beta-unsaturated nitriles substituted in alpha-position, for example, alpha-methyl-acrylonitrile. As starting materials there may be named: alpha,beta-dichlor-propionic nitrile, alpha,beta-dibrompropionic nitrile, alpha, beta-dichlorbutyro-nitrile, alpha,beta-dibrombutyro-nitrile, alpha,beta-dichloro-isobutyric acid nitrile, alpha,beta-dichlorvaleric acid nitrile, alpha,beta-dichlorcaproic acid nitrile, alpha, beta-dichloro-oenanthic acid nitrile, alpha,beta-dichlorhydrocinnamic acid nitrile, alpha,beta - dichlor - (paramethyl)-hydrocinnamic acid nitrile, alpha,beta-dichloro-(ortho-methoxy)-hydrocinnamic acid nitrile and alpha, beta,para-trichlor-hydrocinnamic acid nitrile. As esters of thioglycolic acid there may advantageously be used the esters of low aliphatic alcohols.

The reaction may preferably be carried out as follows: the thioglycolic acid ester is transformed by means of an alkaline condensing agent, advantageously an alkali metal alcoholate, into the corresponding alkali metal compound which is then reacted, preferably while cooling, with the alpha-beta-dihalogeno-nitrile. Condensation simultaneously occurs with separation of the hydrogen halide, and 3-amino-thiophene-2-carboxylic acid ester is obtained which, after neutralization, can be extracted with an organic solvent and purified by distillation or recrystallization.

The 3-amino-thiophene-2-carboxylic acid esters have a pleasant odor which resembles that of the anthranilic acid esters. They can be diazotized and coupled in aqueous solution or be subjected to the reaction of Sandmeyer.

By hydrolysis in the usual manner of the 3-amino-thiophene-2-carboxylic acid esters there are obtained the corresponding free carboxylic acids.

The products obtained by the process of the invention are valuable intermediate products which by various reactions may be transformed into dyestuffs and pharmaceutical products.

The following examples serve to illustrate the invention, but they are not intended to limit it thereto, the parts being by weight, unless otherwise stated:

EXAMPLE 1

*3-Amino-Thiophene-2-Carboxylic Acid Methyl Ester*

A suspension of 29.2 grams of non-alcoholic sodium methylate in 250 cc. of ether is mixed, while cooling and stirring, with a solution of 31.8 grams of thioglycolic acid methyl ester in 30 cc. of ether. In the course of 90 minutes 24.8 grams of alpha,beta-dichlorpropionic acid nitrile in 30 cc. of ether are added dropwise to the reaction mixture and the stirring device is run for an additional 30 minutes. The ocher-colored reaction mixture is mixed with water, acidified with acetic acid until it shows a weakly acid reaction, and the ethereal layer is separated. The aqueous layer is repeatedly extracted with ether until, when coming into contact with a pine splint moistened with hydrochloric acid, it no longer shows an orange coloration. After drying, the ether is distilled off and the residue is subjected to a fractional distillation under reduced pressure. There is obtained the 3-amino-thiophene-2-carboxylic acid methyl ester as a light-yellow oil which boils at 100° to 102° C. under a pressure of 0.1 mm. of mercury and solidifies on standing. After recrystallization from methanol, there are obtained colorless needles melting at 65.5° C. The yield amounts to 72 percent of the theoretical.

The acetyl-amino compound forms colorless prisms melting at 100° C. (recrystallized from methanol).

The benzoyl-amino compound forms colorless leaflets melting at 103° C. (recrystallized from methanol).

3.9 grams of 3-amino-thiophene-2-carboxylic acid methyl ester and 20 cc. of aqueous 4 N-sodium hydroxide solution are heated for 2 hours under reflux. After cooling the mixture is acidified with dilute hydrochloric acid, whereupon the 3-amino-thiophene-2-carboxylic acid separates in the form of a thick colorless precipitate. The compound crystallizes from benzene in the form of colorless needles which decompose at a temperature above 83° C. The yield amounts to 3.4 grams (96 percent of the theoretical).

EXAMPLE 2

*5-Methyl-3-Amino-Thiophene-2-Carboxylic Acid Methyl Ester*

38.1 grams of thioglycolic acid methyl ester, 29.2 grams of sodium methylate and 27.6 grams of alpha,beta-dichlorbutyronitrile are reacted and worked up in the manner described in Example 1. The residue obtained after evaporation of the ether solidifies on standing. By recrystallization from methanol there is obtained 5-methyl-3-amino-thiophene-2-carboxylic acid methyl ester in the form of colorless prisms melting at 72° C. The yield amounts to 29 grams (85 percent of the theoretical).

The acetyl-amino compound forms colorless leaflets melting at 90° C. (recrystallized from methanol).

The benzoyl-amino compound forms colorless needles melting at 145.5° C. to 146.5° C. (recrystallized from methanol).

4.3 grams of 5-methyl-3-amino-thiophene-2-carboxylic acid methyl ester are hydrolyzed as described in Example 1. There are obtained 3.6 grams (91 percent of theoretical yield) of 5-methyl-3-amino-thiophene-2-carboxylic acid which crystallizes from benzene in the form of weakly yellow needles (decomposition at a temperature above 85° C.).

EXAMPLE 3

5-Phenyl-3-Amino-Thiophene-2-Carboxylic Acid Methyl Ester

The reaction mixture obtained from 47.7 grams of thioglycolic acid methyl ester, 43.7 grams of sodium methylate and 60 grams of alpha-beta-dichlor-hydrocinnamic acid nitrile is reacted and worked up as described in Example 1. The precipitate obtained after the decomposition with acetic acid is filtered off, the aqueous phase is repeatedly extracted with methylene chloride and the extract is combined with the ether solution. The residue which remains after drying and evaporation of the organic solvent and the precipitate obtained as described above are recrystallized from acetic acid of 50 percent strength or from methanol. There is thus obtained 5-phenyl-3-amino-thiophene-2-carboxylic acid methyl ester in the form of weakly yellowish needles melting at 150° C. to 151° C. The yield amounts to 46 grams (66 percent of the theoretical).

The acetyl-amino compound forms weakly yellowish needles (recrystallized from methanol) which melt at 134° C. to 125° C.

The benzoyl-amino compound forms weakly yellowish needles (recrystallized from methanol) which melt at 165° C. to 166° C.

5.8 grams of 5-phenyl-3-amino-thiophene-2-carboxylic acid methyl ester, 20 cc. of methanol and 20 cc. of 4 N sodium hydroxide solution are heated for 3 hours under reflux. After cooling, the sodium salt of the acid which has separated is filtered off and introduced into dilute hydrochloric acid during which operation 5-phenyl-3-amino-thiophene-2-carboxylic acid separates in the form of a thick colorless precipitate. When recrystallized from chloroform there are obtained weakly yellowish needles which slowly decompose at a temperature above 94° C. The yield amounts to 5.1 grams (94 percent of the theoretical yield).

EXAMPLE 4

3-Amino-Thiophene-2-Carboxylic Acid Ethyl Ester

The reaction mixture obtained from 30 grams of thioglycolic acid ethyl ester, 27 grams of non-alcoholic sodium ethylate and 24.8 grams of alpha,beta-dichlorpropionitrile is reacted and worked up as described in Example 1. The 3-amino-thiophene-2-carboxylic acid ethyl ester distils at a temperature within the range of 109° C. and 112° C. under a pressure of 0.3 mm. of mercury in the form of a weakly yellow oil which solidifies on cooling. After recrystallization from ethanol there are obtained weakly yellowish cubical crystals melting at 42° C. to 43° C. The yield amounts to 15.2 grams (44 percent of the theoretical yield).

By hydrolysis with 4 N sodium hydroxide solution as described in Example 1 there is obtained, in a yield of 90 percent, 3-amino-thiophene-2-carboxylic acid described in that example.

EXAMPLE 5

5-Methyl-3-Amino-Thiophene-2-Carboxylic Acid Ethyl Ester

The reaction mixture obtained from 22.3 grams of thioglycolic acid ethyl ester, 20 grams of sodium ethylate and 20.5 grams of alpha,beta-dichlorbutyric acid nitrile is reacted and worked up in the manner described in Example 1. The 5-methyl-3-amino-thiophene-2-carboxylic acid ethyl ester obtained distils at a temperature within the range of 120° C. and 124° C. under a pressure of 0.3 mm. of mercury in the form of a weakly yellow oil which solidifies at once. After recrystallization from ethanol there are obtained colorless needles melting at 59° C. to 60° C. The yield amounts to 41 percent of the theoretical.

During hydrolysis as described in Example 1, there is formed, in a yield of 91 percent, 5-methyl-3-amino-thiophene-2-carboxylic acid, as described in Example 2.

EXAMPLE 6

5-Phenyl-3-Amino-Thiophene-2-Carboxylic Acid Ethyl Ester

The reaction mixture obtained from 30 grams of thioglycolic acid ethyl ester, 27 grams of non-alcoholic sodium ethylate and 40 grams of alpha-beta-dichlor-hydrocinnamic acid nitrile in 300 cc. of ether is reacted and worked up in the manner described in Example 1. The 5-phenyl-3-amino-thiophene-2-carboxylic acid ethyl ester formed crystallizes from ethanol in colorless, felted needles melting at 104° C. to 105° C. The yield amounts to 27 grams (55 percent of the theoretical yield).

EXAMPLE 7

3-Amino-4-Methyl-Thiophene-Carboxylic Acid-2-Methyl Ester 29.2 parts of non-alcoholic sodium methylate, suspended in 300 parts of absolute ether, are reacted in the manner described in Example 1 with 26.5 parts of thioglycolic acid methyl ester, while cooling. At an internal temperature within the range of 10° C. and 15° C. a solution of 27.6 parts of alpha-beta-dichloro-isobutyric acid nitrile is 30 cc. of ether is added dropwise to the mixture so obtained and the whole is stirred for another hour. 8 cc. of glacial acetic acid and then 200 cc. of water are added, the aqueous layer is separted and repeatedly extracted with ether. The combined ethereal solutions are washed, with a sodium carbonate solution and water, and dried. When introducing dry hydrogen chloride gas the hydrochloride of 3-amino-4-methyl-thiophene-carboxylic acid-2-methyl ester crystallizes out. The product melts at 78° C. The yield amounts to 63 percent of the theoretical.

The free ester is obtained by treatment with warm sodium carbonate solution and sodium acetate solution. When recrystallized from methanol, it forms colorless needles melting at 84° C. to 85° C.

Acetyl compound: colorless needles (after recrystallization from methanol) melting at 118° C.

Benzoyl compound: colorless spears (after recrystallization from methanol) melting at 105° C.

By hydrolysis in the manner described in Example 1, there is obtained, in a yield of 83 percent, 3-amino-4-methyl-thiophene-carboxylic acid in the form of colorless needles melting at 123° C. (when recrystallized from ethyl acetate).

I claim:

1. A compound of the formula

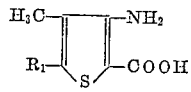

wherein $R_1$ is a member selected from the group consisting of phenyl, p-chlorophenyl, o-methoxyphenyl, and p-tolyl.

2. A compound of the formula

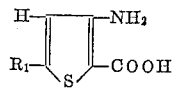

wherein $R_1$ is a member selected from the group consisting of phenyl, p-chlorophenyl, o-methoxyphenyl, and p-tolyl.

3. A compound of the formula

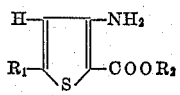

wherein $R_1$ is a member selected from the group consisting of phenyl, p-chlorophenyl, o-methoxyphenyl, and p-tolyl, and $R_2$ is a member selected from the group consisting of methyl and ethyl.

4. A compound of the formula

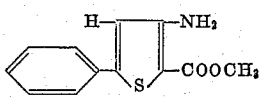

5. A compound of the formula

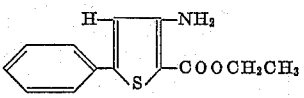

6. The method which comprises reacting an α,β-dihalogeno-nitrile of the formula

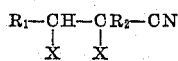

where $R_1$ is a member selected from the group consisting of hydrogen, lower alkyl, phenyl, para-chlorophenyl, ortho-methoxyphenyl and para-tolyl, $R_2$ is a member selected from the group consisting of hydrogen and methyl, and X is a member selected from the group consisting of chlorine and bromine, with a member selected from the group consisting of the methyl and ethyl esters of thioglycolic acid in the presence of an alkali metal alcoholate, whereby esters of 3-amino-thiophene-2-carboxylic acids of the formula

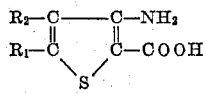

are produced, $R_1$ and $R_2$ having their earlier significance.

7. A process as claimed in claim 6, wherein the 3-amino-thiophene-2-carboxylic acid ester obtained, is hydrolyzed to the corresponding carboxylic acid by heating with a solution of alkali metal hydroxide.

References Cited in the file of this patent

UNITED STATES PATENTS 2,443,598   Cheney et al. _____ June 22, 1948

OTHER REFERENCES

Steinkopf et al.: Chem. Abstracts, vol. 20, p. 2854 (1926).
Rinkes: Chem. Abstracts, vol. 28, col. 4730 (1934).
Dann: Chem. Abstracts, vol. 37, col. 6260 (1943).
Campaign et al.: J. of the Amer. Chem. Soc., vol. 73, pp. 3812–14 (1951).
Hartrough: Thiophene and Its Derivatives, Interscience Publishers, Inc., New York, N.Y., 1952, page 381.
Noller: Textbook of Organic Chemistry, page 200 (1958), Second Edition.